(12) United States Patent
Strasman et al.

(10) Patent No.: US 8,184,687 B1
(45) Date of Patent: May 22, 2012

(54) SYSTEM AND METHOD FOR GENERATING A MOSAIC IMAGE STREAM

(75) Inventors: Nery Strasman, Ramat Gan (IL); Ran Oz, Modi'in (IL)

(73) Assignee: ARRIS Group, Inc, Suwanee, GA (US)

( * ) Notice: Subject to any disclaimer, the term of this patent is extended or adjusted under 35 U.S.C. 154(b) by 1396 days.

(21) Appl. No.: 11/692,934

(22) Filed: Mar. 29, 2007

Related U.S. Application Data

(60) Provisional application No. 60/744,143, filed on Apr. 3, 2006.

(51) Int. Cl.
*H04N 7/12* (2006.01)
(52) U.S. Cl. .................. 375/240.01; 375/240.27
(58) Field of Classification Search ............ 386/68
See application file for complete search history.

(56) References Cited

U.S. PATENT DOCUMENTS

| | | | |
|---|---|---|---|
| 6,064,748 A * | 5/2000 | Hogan | 382/100 |
| 6,608,866 B1 * | 8/2003 | Saunders et al. | 375/240.16 |
| 6,850,564 B1 * | 2/2005 | Pejhan et al. | 375/240.02 |
| 7,164,714 B2 * | 1/2007 | Martin | 375/240.01 |
| 7,660,328 B1 * | 2/2010 | Oz et al. | 370/466 |
| 2002/0145610 A1 * | 10/2002 | Barilovits et al. | 345/538 |
| 2006/0007200 A1 * | 1/2006 | Young et al. | 345/204 |
| 2006/0039481 A1 * | 2/2006 | Shen et al. | 375/240.25 |
| 2008/0292267 A1 * | 11/2008 | Yamada et al. | 386/68 |

* cited by examiner

*Primary Examiner* — Matthew Smithers
(74) *Attorney, Agent, or Firm* — Reches Patents

(57) ABSTRACT

A system and method for generating a mosaic image stream, the method includes: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is slower than the retrieval rate then the retrieving comprises ignoring a group of secondary frames of the certain secondary stream.

21 Claims, 5 Drawing Sheets

300

SYSTEM AND METHOD FOR GENERATING A MOSAIC IMAGE STREAM

RELATED APPLICATIONS

This application claims priority from U.S. provisional patent Ser. No. 60/744,143 dated Apr. 3, 2006.

FIELD OF THE INVENTION

This application relates to system and method for generating a mosaic image stream.

BACKGROUND OF THE INVENTION

Today, many video streams arrive at different devices when they are compressed as MPEG streams. Processing them in the MPEG domain is cheaper and much more cost-effective than decoding the streams, processing the baseband video streams and then encoding the result. MPEG streams include multiple frames that are arranged in group of pictures. A group of pictures (GOP) can start by an independently decodable frame (such as an I frame) that is followed by multiple dependently-decodable frames (such as B frames and P frames). In various applications a mosaic image is required. This can include, for example, Electronic Program Guides, video conferencing, picture in picture applications and the like. For example, a user can receive a mosaic image that includes a large representation of one video stream and multiple thumbnails of the other video streams. In this case, the associated audio stream is the one originally associated with the large-representation stream.

There is a growing need to generate mosaic images with relatively simple and low cost systems.

SUMMARY

A method for generating a mosaic image stream is provided. The method includes: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is faster than the retrieval rate then the retrieving comprises ignoring a group of secondary frames of the certain secondary stream.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

According to an embodiment of the invention a simple low cost system for providing a mosaic image stream is provided. The system includes small buffers and can compose mosaic images with minimal processing. The composition includes mainly retrieving received frame information in the correct order at a time aligned manner.

The system can receive a primary stream (such as a large-representation stream) and multiple secondary streams (also referred to as thumbnailed-streams) and combine them, while performing (when necessary) relatively simple rate-difference compensating measures.

Conveniently, the mosaic stream composing is simplified by encoding the various media streams by applying the same encoding characteristics and applying relatively simple rate-difference compensation operations. Nevertheless, even when the same encoding parameters are applied the encoding rates of different encoders (and accordingly the reception rate of the streams generated by the encodes) can differ from each other thus can cause buffer overflows and/or underflows that are prevented by the suggested system and method. The clock rates of different encoders differ from each other. Typically, encoders generate a fixed number of frames per second. In the United States this number is 29.97 or 30. Even if the differences between the clock rates are small they accumulate over time and are eventually noticed. During a certain time period one encoder will generate more frames than another encoder.

Figure 1:
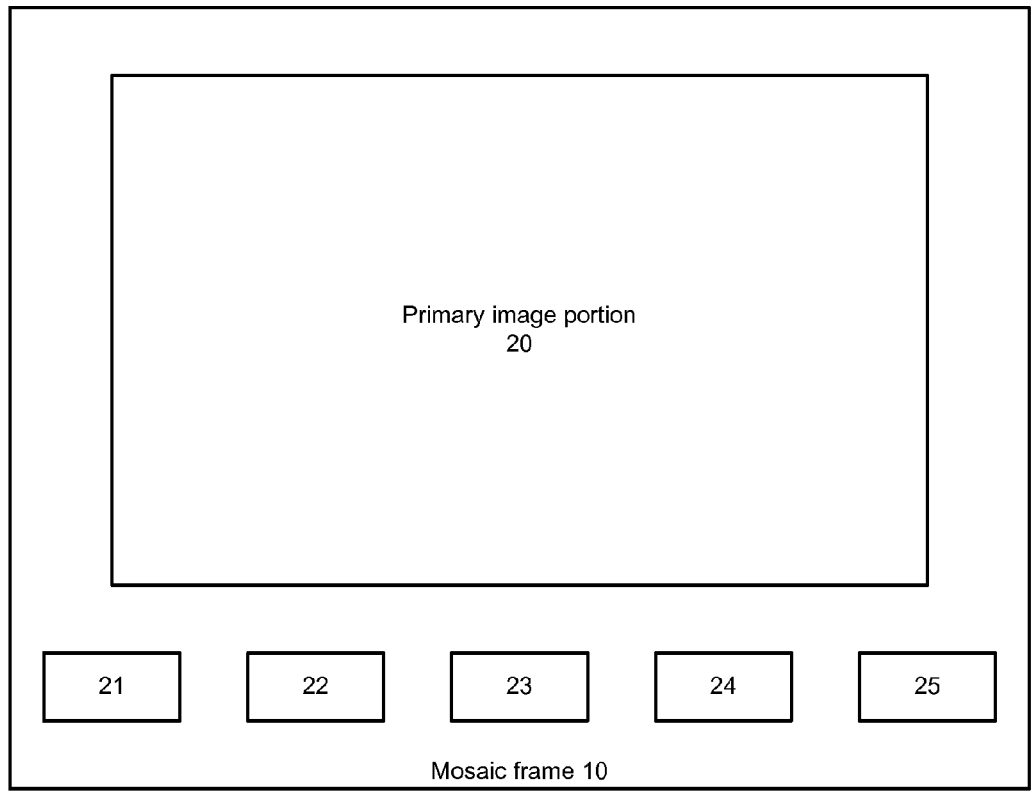
FIG. 1 illustrates a mosaic image.

FIG. 1 illustrates mosaic image 10 that includes a primary frame 20, and multiple secondary frames 21-25. Primary frame is positioned above multiple secondary frames 21-25.

Figure 2:
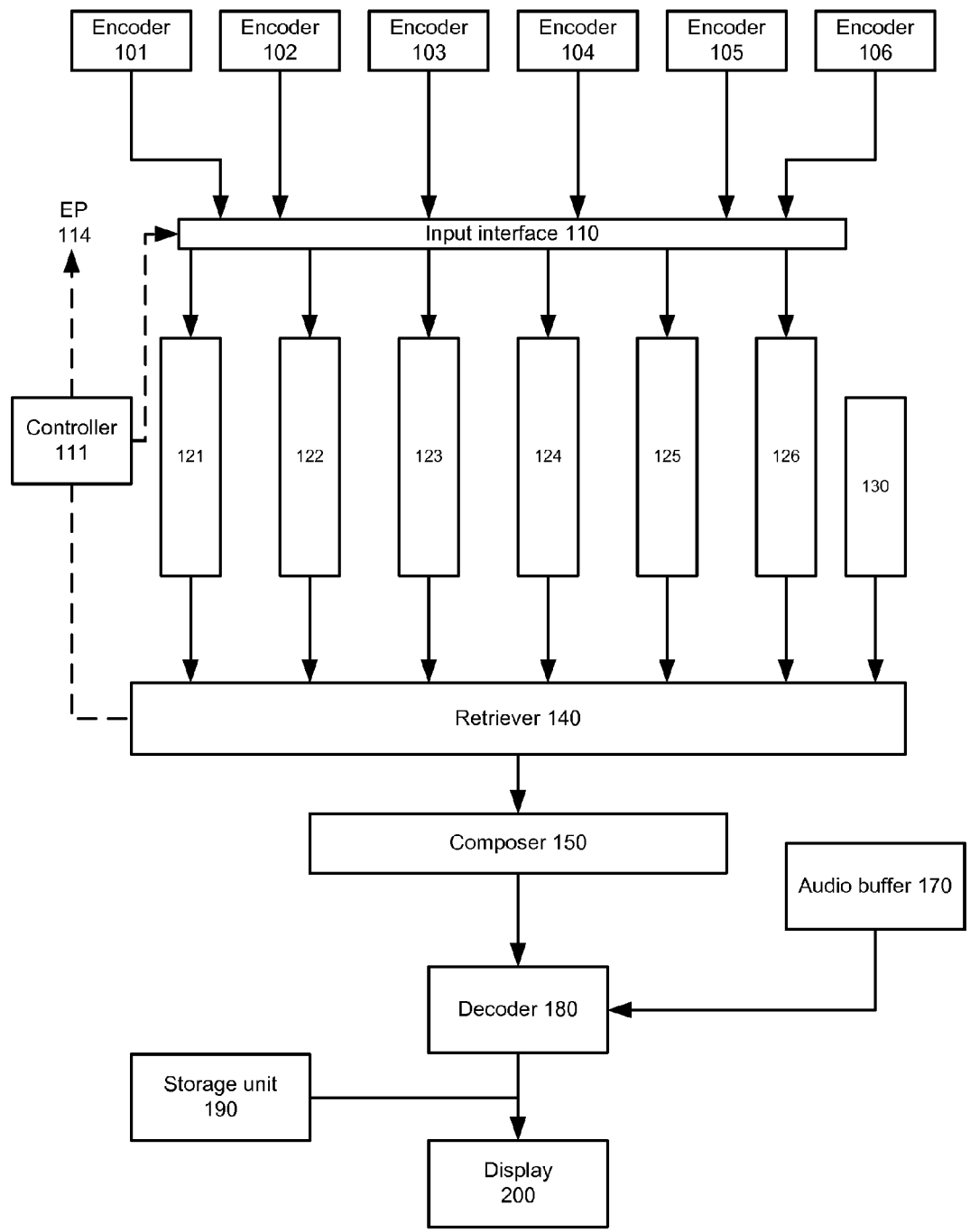
FIG. 2 illustrates a system and its environment, according to an embodiment of the invention.

FIG. 2 illustrates system 100 and multiple encoders 101-106 according to an embodiment of the invention.

System 100 includes input interface 110, controller 111, primary buffer 121, secondary buffers 122-126, background generator 130, retriever 140, frame composer (also referred to as composer) 150, audio buffer 170, decoder 180, storage unit 190 and display 200. It is noted that system 100 does not necessarily include decoder 180, storage unit 190 and display 200, it can only be connected to these components.

Input interface 110 is connected to primary encoder 101 and multiple secondary encoders 102-106. Primary buffer 121 and secondary buffers 122-126 are connected to input interface 110 and to retriever 140. Retriever 140 is also connected to background generator 130.

Composer 150 is connected between retriever 140 and between decoder 180. Decoder 180 is also connected to audio buffer 170, storage unit 190 and display 200.

Primary frames are sent from primary encoder 101 via input interface 110 to primary buffer 121. Secondary frames of a first secondary stream and sent from first secondary encoder 102 via input interface 110 to first secondary buffer 122. Secondary frames of a second secondary stream are sent from second secondary encoder 103 via input interface 110 to second secondary buffer 123. Secondary frames of a third secondary stream are sent from third secondary encoder 104 via input interface 110 to third secondary buffer 124. Secondary frames of a fourth secondary stream are sent from fourth secondary encoder 105 via input interface 110 to fourth secondary buffer 125. Secondary frames of a fifth secondary stream are sent from fifth secondary encoder 106 via input interface 110 to fifth secondary buffer 126. It is noted that the amount of secondary streams can differ from five. It is also noted that a primary stream can become a secondary stream and vice verse.

Conveniently, each buffer out of buffers 121-126 stores a small number of groups of frames, conveniently up to two groups of frames. Thus, primary buffer 121 stores up to two primary groups of frames and each of the secondary buffers (122-126) stores up to two secondary groups of frames. It is noted that the small number can exceed two. By storing small numbers of group of frames the aggregate buffers size is relatively small.

In order to compensate for rate-differences resulting from differences in the encoding rates of the primary stream and the secondary streams system 100 takes advantage of the fact that the secondary streams represent relatively small portions of the mosaic image and that secondary audio streams are not outputted by system 100. Accordingly, complex audio and video synchronization stages of secondary streams are avoided.

System 100 can drop (by ignoring or just not retrieving) a whole group of secondary frames to prevent overflow if the reception rate of a secondary stream is faster than the retrieval rate of retriever 140. The drop can be performed in response to the state of the secondary buffer that stores the group of secondary frames. Accordingly, retriever 140 can ignore a group of secondary frames that belong to certain secondary frame stream if the encoding rate of the certain secondary frame stream is faster than an encoding rate of the retrieval rate.

System 10 can prevent underflow by generating more secondary frames than the received secondary frames. For example, system 10 can generate a synthetic group of secondary frames that may start by an independently decodable frame of a previous group of secondary frames (for example the last retrieved I frame of that certain secondary stream) that is followed by multiple dependently-decodable duplicating frames (for example multiple B frames and/or P frames and especially duplicating B-frames and duplicating P frames).

A dependently-decodable duplicating frame may include information that merely instructs decoder 180 to duplicate an independently decodable frame that belongs to the same group of secondary frames. For example, assuming that the group of secondary frames are MPEG-2 compliant than a synthetic group of secondary frames starts by an I frame of a previous GOP and is followed by B-frames and P-frames that include instructions to duplicate the I-frame. These P-frames and B-frames are very small and can include zero valued motion vectors or (if zero valued motion vectors are the default motion vectors) include no motion vector information at all.

Retreiver 140 can re-fetch secondary frames from a secondary buffer when one mosaic frame is generated (for example an independently decodable mosaic frame). Alternatively, composer 150 can generate dependently-decodable secondary frames. In both cases a secondary buffer can be filled (by newly received secondary frames) without being emptied during the re-fetch or during the usage of the dependently-decodable secondary frames.

It is noted that system 100 can also generate additional secondary frames by re-sending to composer 150 a group of secondary frames that were already sent to composer 150. This method may require slightly deeper secondary buffers.

System 100 can also receive primary audio information associated with a primary group of frames, store it at audio buffer 170 and provide to decoder 180 the audio information in synchronization with a provision of mosaic image information such as to enable the decoder to output an audio-visual mosaic stream.

Figure 4:
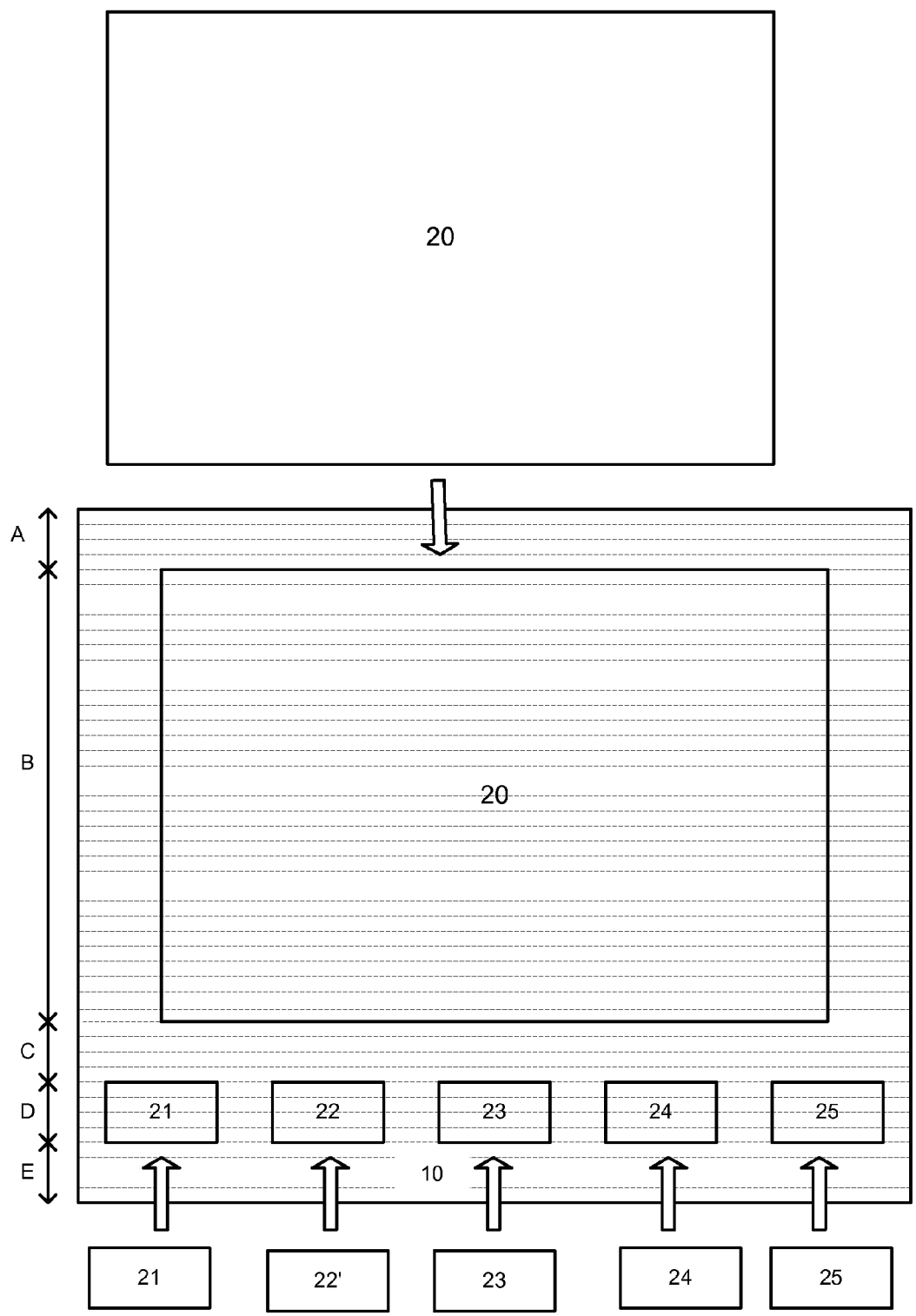
FIG. 4 illustrates a mosaic image according to an embodiment of the invention.

FIG. 4 illustrates a mosaic image 10 that includes a primary frame 20, and multiple secondary frames 21-25. Mosaic image 10 is represented by multiple slices. The slices of area A include background information only. The slices of area B (below area A) include primary frame information that is surrounded by background information. The slices of area C (below area B but above area D) include background information. The slices of area D include the following sequences of information: background information, first primary portion information, background information, second primary portion information, background information, third primary portion information, background information, fourth primary portion information, fifth primary portion information and finally background information. The slices of area E (below area D) include background information only. It is noted that if the location of the different primary and secondary image portions is fixed or other wise known to the decoder than the background information may not be explicitly mentioned.

Retriever 140 can retrieve mosaic frame information in response to a location of a primary frame within the mosaic frame and to locations of secondary frames within the mosaic frame. Referring to the example set fourth in FIG. 4, retriever 140 will retrieve mosaic frame information from primary frame 20 to generate area B before it starts retrieving mosaic frame information from secondary frames 21-25. Assuming a left-to right scanning mode, slices of area D will be generated by retrieving mosaic frame information from secondary frame 21, secondary frame 22, secondary frame 23, secondary frame 24 and finally from secondary frame 25.

Figure 3A:
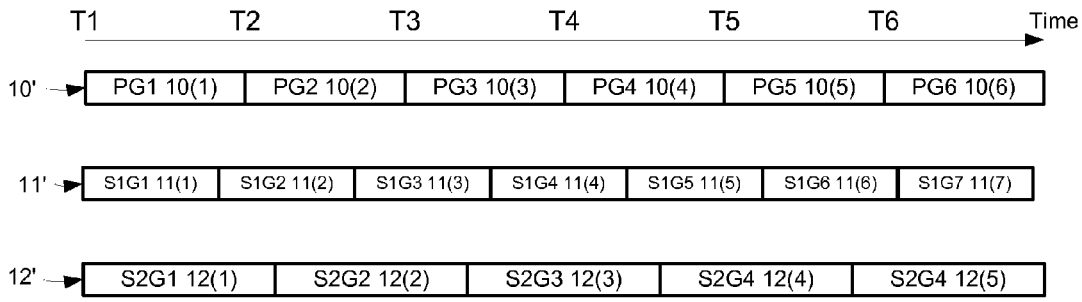
FIGS. 3a and 3b are timing diagrams illustrating a reception process and a retrieval process according to an embodiment of the invention.
Figure 3B:
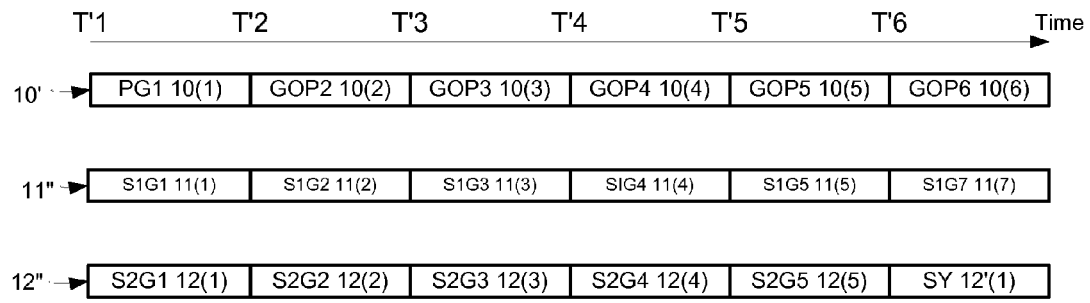

FIGS. 3*a* and 3*b* illustrates a reception of multiple groups of pictures 10(1)-12(5) and the retrieval of multiple groups of pictures 10(1)-12(5).

FIG. 3*a* illustrates the reception of six primary groups of frames PG1-PG6 10(1)-10(6), the reception of seven secondary groups of frames S1G1-S1G7 11(1)-11(7) that belong to a first secondary stream, and the reception of five secondary groups of frames S2G1-S2G4 12(1)-12(5) that belong to a second secondary stream. The different numbers (six, seven and five) of group of frames result from different encoding rates. It is noted that the groups of frames are not necessarily aligned.

FIG. 3*b* illustrates a retrieval process that is executed at a retrieval rate that corresponds to the encoding rate of the primary media stream.

The retrieval rate (of retriever 140) is slower than the reception rate of the first secondary stream. Accordingly, occasionally a group of frames should be ignored of, as illustrated by S2G5 11(5) that is followed by S2G7 11(7), and not by S2G6 11(6). This will hardly be noticeable as the GOP structure in the output will be maintained and the mosaic's audio stream is not the audio associated with the first secondary stream—therefore there will not be any audible effects.

The retrieval rate is faster than the reception rate of the second secondary frame, thus occasionally a synthetic group of frames should be inserted, as illustrated by SY 12'(1) that follows S2G1-S2G5 12(1)-12(5). Assuming that the second secondary stream is MPEG 2 compliant then SY 12'(1) includes the I frame of S2G5 12(5) as well as multiple duplicating B frames and P frames. This will hardly be noticeable as the GOP structure in the output will be maintained and the mosaic's audio stream is not the audio stream associated with the second secondary stream. Alternatively (not illustrated in FIG. 3*b*) a previous GOP can be re-fetched.

Referring to the example set forth in FIG. 4, a certain group of mosaic images can be constructed from a group of primary frames and multiple groups of secondary frames.

Yet another group of mosaic images can be constructed from a group of primary frames, a synthetic group of frames of one or more secondary frames and one or more groups of other secondary frames. If the secondary frames are MPEG-2 compliant than the synthetic group of secondary frames starts by an I frame of a previous GOP and is followed by B-frames and P-frames that include instructions to duplicate the I-frame. These P-frames and B-frames are very small and can include zero valued motion vectors or (if zero valued motion vectors are the default motion vectors) include no motion vector information at all.

Yet a further group of mosaic images can be constructed of a group of primary frames, and multiple secondary frames, wherein at least one group of secondary frames that were received during the construction of group of mosaic images are ignored.

Figure 5:
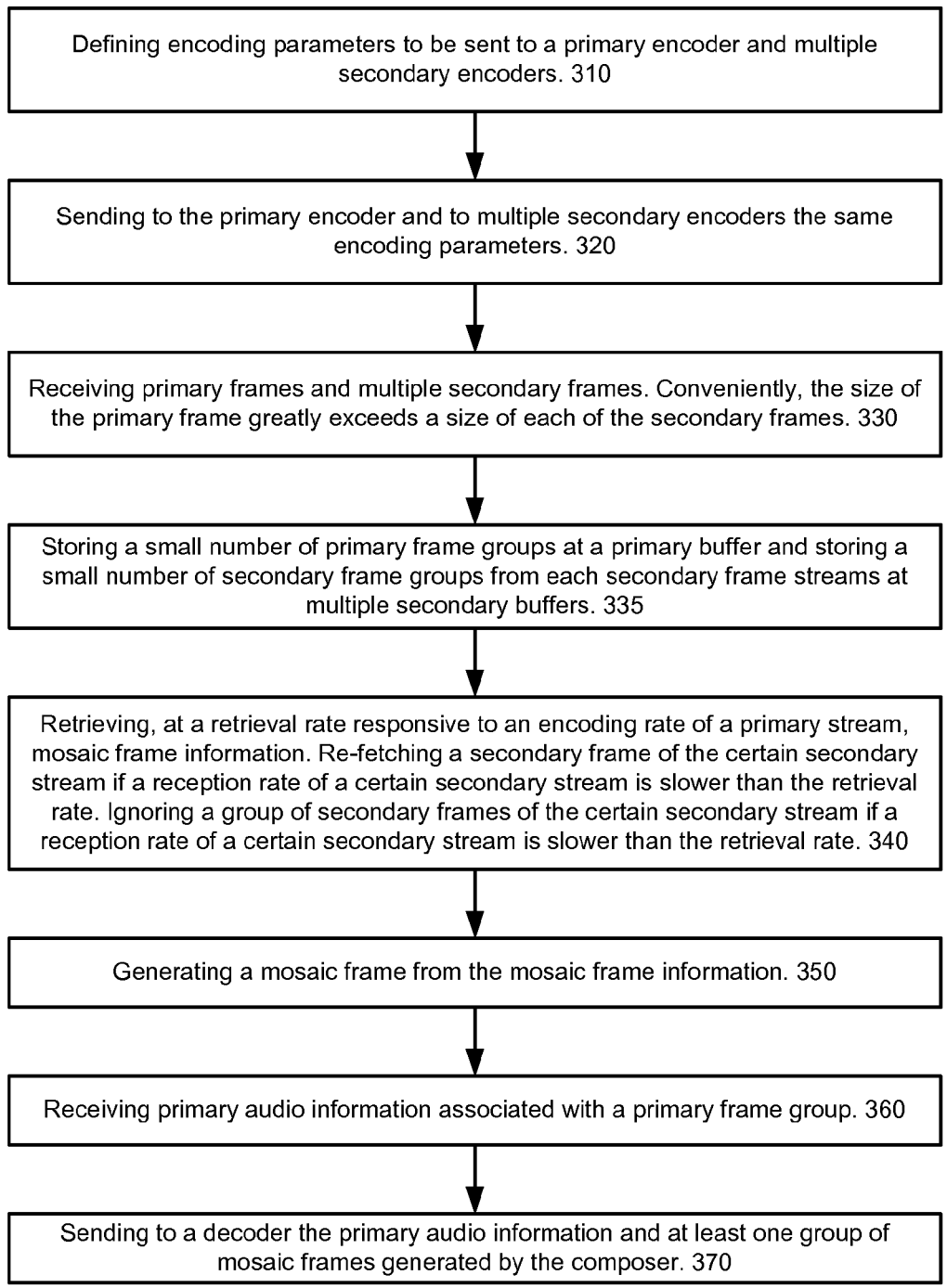
FIG. 5 illustrates a method for generating a mosaic stream according to an embodiment of the invention.

FIG. 5 illustrates method 300 for generating a mosaic image stream, according to an embodiment of the invention.

Method 300 starts by stage 310 of defining encoding parameters to be sent to a primary encoder and multiple secondary encoders.

Stage 320 is followed by stage 320 of sending to the primary encoder and to multiple secondary encoders the same encoding parameters.

After preliminary stages 310 and 320 are completed method 300 can continue to stage 330.

Stage 330 includes receiving primary frames and multiple secondary frames. Conveniently, the size of the primary frame greatly exceeds a size of each of the secondary frames.

Stage 330 is followed by stage 335 of storing a small number of primary frame groups at a primary buffer and storing a small number of secondary frame groups from each secondary frame streams at multiple secondary buffers. Conveniently, stage 335 includes storing a pair of primary frame groups at the primary buffer and storing a pair of secondary frame groups from each secondary frame streams at multiple secondary buffers.

Stage 335 is followed by stage 340 of retrieving, at a retrieval rate responsive to an encoding rate of a primary stream, mosaic frame information. The mosaic frame information includes a primary frame and multiple secondary frames. The secondary frames can include synthetic secondary frames and/or re-fetched frames. The retrieval can include ignoring a group of secondary frames.

Conveniently, if a reception rate of a certain secondary stream is slower than the retrieval rate then stage 340 includes re-fetching a secondary frame of the certain secondary stream. It is noted that a group of mosaic frames can be generated by re-fetching one secondary frame after the other. Alternatively, stage 340 can include generating a synthetic group of frames. A synthetic group of secondary frames can include (assuming MPEG-2 compliance) an I frame of a previous GOP that is followed by B-frames and P-frames that include instructions to duplicate the I-frame. These P-frames and B-frames are very small and can include zero valued motion vectors or (if zero valued motion vectors are the default motion vectors) include no motion vector information at all. The duplicating I-frames and P-frames can be generated in advance or can be generated in real-time. This I frame is conveniently re-fetched from a secondary buffer.

According to an embodiment of the invention stage 340 may include retrieving mosaic frame information in response to a location of a primary frame within the mosaic frame and to locations of secondary frames within the mosaic frame.

Conveniently, if a reception rate of a certain secondary stream is faster than the retrieval rate then the retrieving comprises ignoring a group of secondary frames of the certain secondary stream.

Stage 340 is followed by stage 350 of generating a mosaic frame from the mosaic frame information. Conveniently, if the reception rate of a certain secondary stream is slower than the retrieval rate then stage 350 of generating includes generating dependently-decodable duplicating frames and associating at least one dependently-decodable duplicating frame with a secondary frame of the certain secondary frame stream.

Stages 330-350 are repeated provide a group of mosaic frames. Once a group of mosaic frames is generated another repetition of stages 330-350 can be executed to provide another group of mosaic frames.

Those of skill in the art will appreciate that method 300 is a pipelined process. Accordingly, different stages that manage different information can overlap. For example, while method 300 generates a mosaic frame it can receive information relating to the next mosaic frame.

Conveniently, method 300 includes stage 360 of receiving primary audio information associated with a primary frame group and stage 370 of sending to a decoder the primary audio information and at least one group of mosaic frames generated by the composer.

According to an embodiment of the invention the mentioned above method can be implemented by executing a computer readable code embedded in a computer readable medium. The computer readable medium can be read by using electromagnetic fields, applying light or electricity and the like. The computer readable medium can be a disk, a diskette, a tape, a compact dist a DVD and the like.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for generating a mosaic image stream, the method comprises: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is faster than the retrieval rate then the retrieving comprises ignoring a group of secondary frames of the certain secondary stream.

2. A method for generating a mosaic image stream, the method comprises: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is faster than the retrieval rate then the retrieving comprises ignoring a group of secondary frames of the certain secondary stream; wherein if the reception rate of a certain secondary stream is slower than the retrieval rate then the generating comprises generating dependently-decodable duplicating frames and associating at least one dependently-decodable duplicating frame with a secondary frame of the certain secondary frame stream.

3. The method according to claim 2 wherein the retrieving is preceded by storing a small number of primary frame groups at a primary buffer and storing a small number of secondary frame groups from each secondary frame streams at multiple secondary buffers.

4. The method according to claim 3 wherein the storing comprises storing a pair of primary frame groups at the primary buffer and storing a pair of secondary frame groups from each secondary frame stream at the multiple secondary buffers.

5. The method according to claim 2 further comprising receiving primary audio information associated with a primary frame group and sending to a decoder the primary audio information and at least one group of mosaic frames generated by the composer.

6. A method for generating a mosaic image stream, the method comprises: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is faster than the retrieval rate then the retrieving comprises ignoring a group of secondary frames of the certain secondary stream; wherein the retrieving is responsive to a location of a primary frame within the mosaic frame and to locations of secondary frames within the mosaic frame.

7. The method according to claim 6 wherein the retrieving is preceded by sending to a primary encoder and to multiple secondary encoders the same encoding parameters.

8. The method according to claim 6 wherein the size of the primary frame is at least seven times a size of each of the secondary frames.

9. A system for generating a mosaic image stream, the system includes:
a retriever, connected to a composer and adapted to retrieve, at a retrieval rate responsive to an encoding rate of a primary stream, mosaic frame information that comprises a primary frame and multiple secondary frames;
wherein the composer is connected to the retriever, and is adapted to generate a mosaic frame from the mosaic frame information;
wherein the system is adapted to repeat the retrieval and generation to provide a group of mosaic frames;
wherein the retriever re-fetches a secondary frame of a certain secondary stream if a reception rate of the certain secondary stream is slower than the retrieval rate then the retrieving comprises re-fetching a secondary frame of the certain secondary stream; and
wherein the retriever is adapted to ignore a group of secondary frames of a certain secondary stream if a reception rate of the certain secondary stream is faster than the retrieval rate.

10. The system according to claim 9 further comprising a primary buffer and multiple secondary buffers; wherein the primary buffer is adapted to store a small number of primary frame groups, each secondary buffer adapted to store a small number of secondary frame groups.

11. The system according to claim 10 further comprising a primary buffer adapted to store a pair of primary frame groups and each secondary buffer is adapted to store a pair of secondary frame groups.

12. The system according to claim 9 wherein the system is adapted to generate dependently-decodable duplicating frames and associate at least one dependently-decodable duplicating frame with a secondary frame of a certain secondary frame stream, if the reception rate of the certain secondary stream is slower than the retrieval rate.

13. The system according to claim 9 further comprising a audio buffer adapted to store primary audio information associated with a primary frame group; wherein the audio buffer is coupled to a decoder that is adapted to retrieve the primary audio information and at least one group of mosaic frames generated by the composer.

14. The system according to claim 9 wherein the retriever retrieves mosaic frame information in response to a location of a primary frame within the mosaic frame and to locations of secondary frames within the mosaic frame.

15. The system according to claim 9 further adapted to send to a primary encoder and to multiple secondary encoders the same encoding parameters.

16. The system according to claim 9 wherein the size of the primary frame is at least seven times a size of each of the secondary frames.

17. A non-transitory computer readable medium embedding a computer readable code that includes instructions for: retrieving, at a retrieval rate responsive to an encoding rate of a primary stream, mosaic frame information that comprises a primary frame and multiple secondary frames; generating a mosaic frame from the mosaic frame information; and repeating the retrieving and generating to provide a group of mosaic frames; wherein if a reception rate of a certain secondary stream is slower than the retrieval rate then the retrieving comprises re-fetching a secondary frame of the certain secondary stream; and wherein if a reception rate of a certain secondary stream is faster than the retrieval rate then the retrieving comprises ignoring a group of secondary frames of the certain secondary stream.

18. The non-transitory computer readable medium according to claim 17 wherein the computer readable code includes instructions for storing a small number of primary frame groups at a primary buffer and storing a small number of secondary frame groups from each secondary frame streams at multiple secondary buffers.

19. The non-transitory computer readable medium according to claim 17 wherein the computer readable code includes instructions for generating dependently-decodable duplicating frames and associating at least one dependently-decodable duplicating frame with a secondary frame of the certain secondary frame stream if the reception rate of a certain secondary stream is slower than the retrieval rate.

20. The non-transitory computer readable medium according to claim 17 wherein the computer readable code includes instructions for retrieving in response to a location of a primary frame within the mosaic frame and to locations of secondary frames within the mosaic frame.

21. The non-transitory computer readable medium according to claim 17 wherein the computer readable code includes instructions for sending to a primary encoder and to multiple secondary encoders the same encoding parameters.

* * * * *